United States Patent

Buletti

[15] 3,688,879
[45] Sept. 5, 1972

[54] AUXILIARY BRAKE SYSTEM

[72] Inventor: Arnold A. Buletti, 1295 Petaluma Blvd. N., Petaluma, Calif. 94952

[22] Filed: July 7, 1970

[21] Appl. No.: 52,973

[52] U.S. Cl. ................. 188/353, 180/114, 188/365, 303/89
[51] Int. Cl. .............................................. B60t 7/10
[58] Field of Search ....... 180/114; 188/106 A, 106 F, 188/106 R, 106 P, 170, 265, 353, 365; 303/89

[56] References Cited

UNITED STATES PATENTS

| | | | |
|---|---|---|---|
| 2,451,325 | 10/1948 | Eksergian et al. | 188/365 X |
| 2,630,885 | 3/1953 | Carnes | 188/365 X |
| 2,670,063 | 2/1954 | Reynolds | 188/353 X |
| 3,463,276 | 8/1969 | Brooks | 188/170 X |
| 3,513,946 | 5/1970 | Rick | 188/353 |

*Primary Examiner*—Duane A. Reger
*Attorney*—Gordon Wood

[57] ABSTRACT

An emergency brake system which effects an automatic engagement of the wheel brakes of a vehicle upon failure of the main brake system. The auxiliary brake system also provides for the engagement of the brakes when the engine is shut off as in parking. The auxiliary brake cylinders act radially on the brake shoes thus simplifying the construction over the prior art. The source of fluid pressure for the auxiliary brake system is conveniently mounted on the master cylinder of the conventional system thus lending the invention to a simple installation.

3 Claims, 4 Drawing Figures

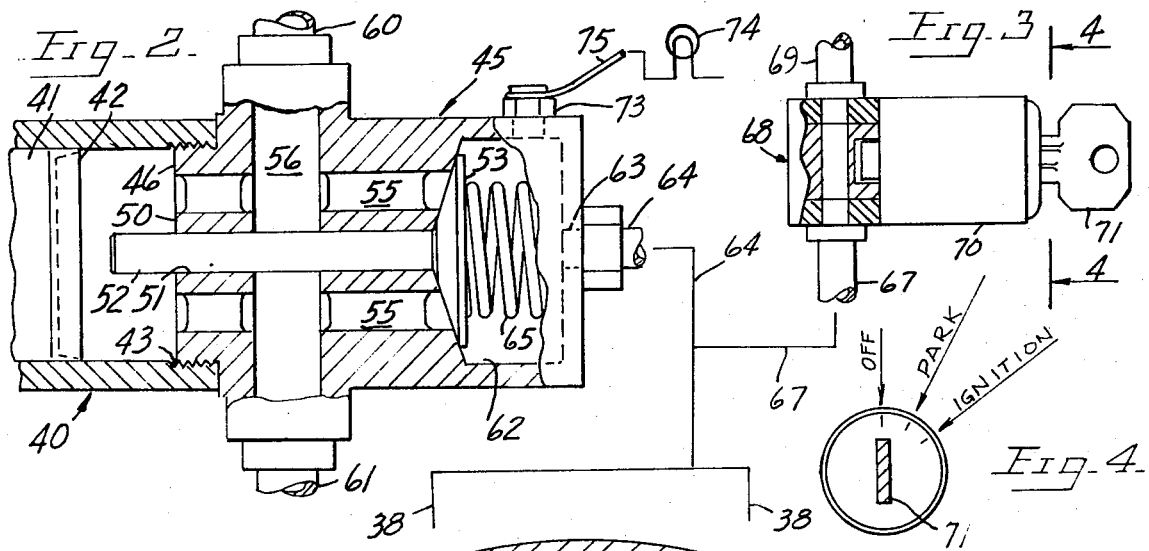
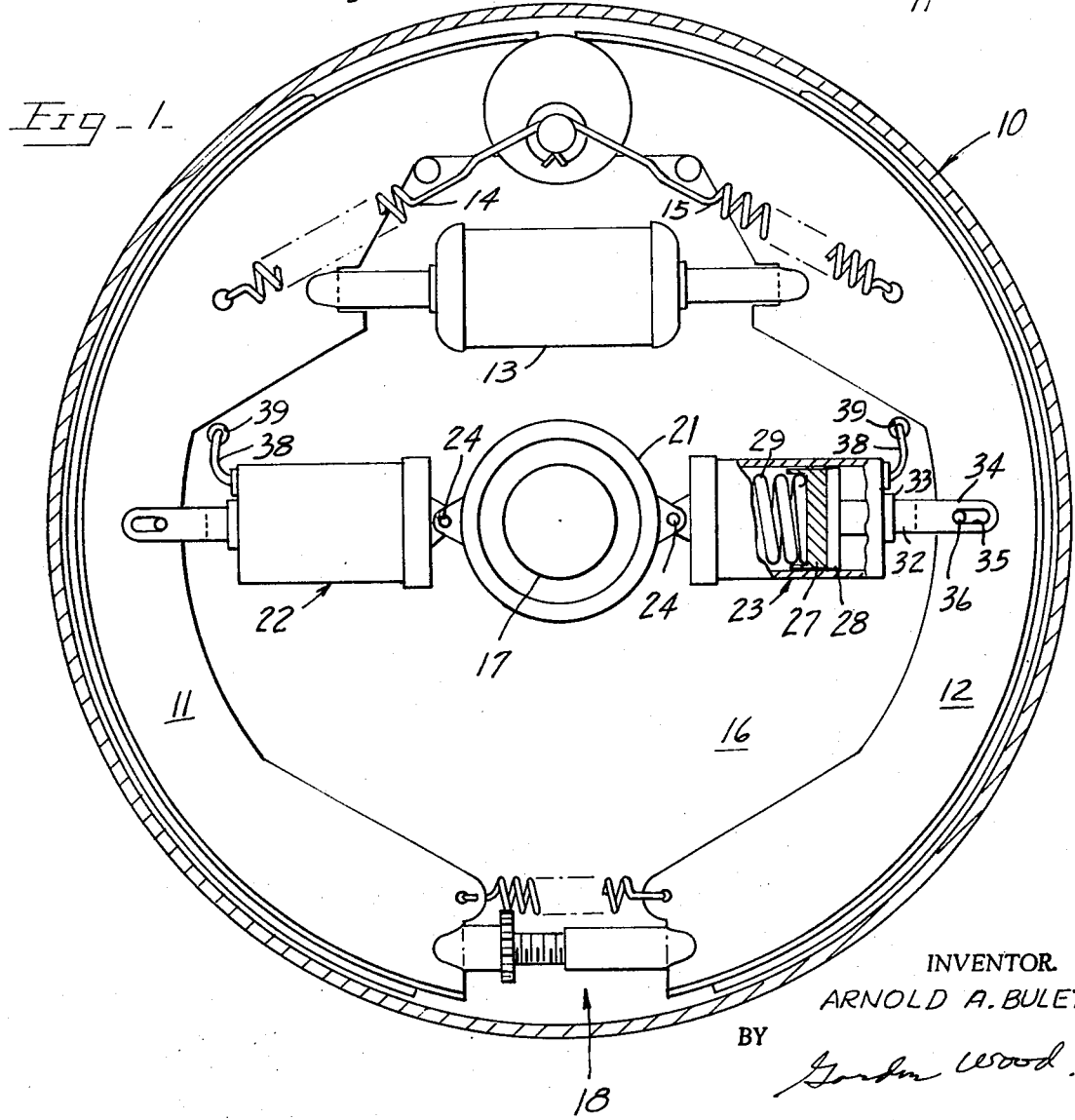

AUXILIARY BRAKE SYSTEM

This invention relates to a fluid actuated brake system and particularly to an auxiliary brake system which causes automatic engagement of the brakes upon failure of the main brake system and which also permits the auxiliary system to be actuated when the engine of the vehicle is shut off or when the vehicle is parked.

The prior art discloses several types of brake systems which have as their object the provision of an auxiliary brake arrangement which includes a continuously acting force means tending to engage the brakes at all times and which force means is opposed by fluid pressure so that the brakes are normally disengaged. However upon failure of the fluid pressure system manifested by a sharp reduction in the fluid pressure the brakes are automatically engaged by the continuously acting force means which most conveniently is in the form of a spring.

The main object of the present invention is to generally improve auxiliary brake systems of the above described type.

Another object of the invention is the provision of an auxiliary brake system which may be conveniently installed to supplement the conventional hydraulic system employed on most automobiles. In this connection the invention provides for auxiliary actuation of the brake shoes by radially directed forces thus obviating complicated linkages heretofore required in previous systems having similar objects.

Another object of the invention is the provision of an auxiliary brake which may be conveniently powered by the same power source as exists in conventional brakes and which may readily be installed in vehicles having a conventional system.

Still another object of the invention is the provision of an auxiliary brake system which may be actuated by means of the ignition lock thereby automatically setting the brakes when the ignition is turned off and at the same time providing an intermediate position of the ignition lock at which the vehicle may be idled and at the same time have the auxiliary brakes set so as to prevent accidental movement of the car while in a parked condition with the motor running.

Other objects and advantages will be apparent from the following specification and the drawing.

FIG. 1 is a side elevation of a wheel brake assembly incorporating the invention.

FIG. 2 is a vertical fragmentary cross sectional view of the output end of a master cylinder showing a portion of the present invention attached thereto.

FIG. 3 is a side elevation of an ignition lock showing a valve attached thereto which is adapted to be actuated by the turning of the ignition key.

FIG. 4 is a vertical section taken in a plane indicated by lines 4—4 of FIG. 3 and showing schematically the various positions of the key.

In detail and first with reference to FIG. 1 the preferred embodiment of the invention is shown incorporated in a conventional automobile brake system which includes a wheel brake drum 10 against which a pair of brake shoes 11, 12 are adapted to be engaged by actuation of a brake cylinder 13. Upon outward movement of the arms of the brake cylinder 13 the brake shoes 11, 12 are urged into engagement with the brake drum 10 and, upon reduction in pressure of the fluid brake cylinder 13 said shoes are returned to their inner positions by springs 14, 15. The brake drum 10 is mounted on an anchor plate 16 through which the axle 17 of the vehicle passes. At the lower end of the brake drum an adjustment screw and spring assembly generally designated 18 is provided.

By the present invention an annular hub 21 is fixedly secured centrally of the anchor plate 16 and a pair of auxiliary cylinders 22, 23 are pivotally supported at their inner ends to hub 21 by means of pivots 24. Each auxiliary cylinder is provided with a piston 27 and a rubber cup 28 which are urged radially outwardly of the brake drum by means of compression spring 29. A fluid cylinder is thus formed at the outer end of each auxiliary cylinder and the rod 32 of piston 27 passes through a fluid tight connection 33 at the outer end of the cylinder and is formed with a clevis 34 the arms of which are provided with slots 35 which receive therein a pin 36 fixedly secured to the associated brake shoe.

Fluid under pressure is adapted to be introduced into the cylinder through the flexible conduit 38 which in turn may be passed through an aperture 39 and anchor plate 16.

It will be apparent that the auxiliary cylinders 22, 23 do not interfere with the action of the main brakes system when fluid under pressure is introduced through conduit 38 to compress the spring 29. When the cylinders are in such a compressed condition the pin 36 may slide along the slots 35 to permit the main brake system to act in a normal way. However when the pressure in conduits 38 is released for any reason the springs 29 of the cylinders urge the pins 36 radially outwardly thus engaging the brake shoes 11, 12 against the brake drum 10.

Referring now to FIG. 2 the discharge end of a conventional master cylinder is indicated at 40 and the conventional piston and rubber cup are indicated at 41, 42 respectively. In a normal installation a plug is threadedly secured by means of internal treads 43 to the end of master cylinder 40 and the discharge conduit which leads to the brake cylinders is connected through such plug to the master cylinder. By the present invention such plug is omitted and a special housing generally designated 45 is provided and is threaded at one end 46 for securement to the master cylinder. Centrally of the housing 45 the same is formed with a spider 50 which is provided with a central bore 51 for slidably receiving therein the stem 52 of a valve element 53. The provision of said spider 50 results in the formation of a plurality of longitudinally extending passageways 55. Intersecting with said passageways 55 and extending transversely of the housing 45 is a passageway 56 through which brake fluid is conducted from master cylinder 40 to a pair of discharge conduits 60, 61 which lead to the four brake cylinders 13 in the conventional manner.

The opposite end of housing 45 is provided with a chamber 62 in which is positioned a compression spring 65 urging the valve element 53 against the ends of the passageways 55 thus normally closing off the flow from passageways 55 to chamber 62. The fluid in chamber 62 is discharged through aperture 63 to a conduit 64 which in turn is connected to the conduits 38 leading to the auxiliary cylinders 22, 23.

The force of spring 65 is sufficient so that under normal driving conditions the pressure developed in master cylinder 40 is not sufficient to open the valve 53 while the brake fluid is being driven through conduits 60, 61 to the brake cylinders 13. However upon forcefully applying the brake pedal the pressure in master cylinder 40 may be increased to a point at which the force of spring 65 is overcome and fluid is applied under pressure to auxiliary cylinders 22, 23. Once this has been done and check valve 53 is closed it will be apparent that the brake fluid is substantially solid within chamber 62 and conduits 64, 38 thus opposing the force of springs 29 in the auxiliary cylinders sufficiently to place the auxiliary brake in the normal condition of FIG. 1.

In the event of a failure of the conventional brake system, however, the leakage of oil from such system will result in the piston 41 overtravelling so that the cup 42 engages the valve stem 52 causing the valve 53 to open and relieve the fluid pressure in cylinders 22, 23. In this condition the springs 29 in cylinders 22, 23 urge the brake shoes 11, 12 into engagement with the brake drum.

Since it is desirable to engage the auxiliary brake system when the vehicle is parked the line 64 is connected by a line 67 to a valve 68 which in turn discharges through line 69 to the reservoir (not shown) of the master cylinder. The valve 68 is fixedly connected to the ignition lock generally designated 70 which is actuated by a key 71. As best seen in FIG. 4 when the key 71 is turned vertically to its "off" position the auxiliary cylinders 22, 23 are connected with the reservoir of the master cylinder thus causing the auxiliary brake system to engage. When the plug of valve 68 is turned sufficiently to the ignition position (FIG. 4) the valve is closed thus permitting the auxiliary brake cylinders 22, 23 to be disengaged by the operator by exerting sufficient force on the brake pedal to open valve 53 and oppose the springs 29.

As best seen in FIG. 4 the valve 68 is designed so that when the key 71 is in an intermediate position the valve is still open so that the key may be set in such intermediate position with the motor running and at the same time have the auxiliary brakes set.

If desired a pressure actuated switch 73 on housing 45 may be connected with a dashboard lamp 74 by a lead 75 so that the engagement of the auxiliary brake is indicated to the operator when the lamp 74 is on.

It will be apparent that the above described invention provides a simple means for effecting a hydraulic brake system which may be employed as an emergency auxiliary brake and also as a safety parking brake. In the interest of clarity the hand actuated brake system has been omitted. Also it will be apparent that the hand actuated release brake may be provided to release the auxiliary brake system if it is desired to move the vehicle a short distance after the auxiliary system has been engaged under emergency conditions.

I claim:
1. In a fluid actuated brake system that includes a master cylinder and a brake cylinder operatively connecting said master cylinder with a wheel brake,
an auxiliary brake cylinder operatively connected with said wheel brake for disengaging said brake when fluid under pressure is applied thereto,
continuously acting force means cooperating with said auxiliary brake cylinder for urging the latter toward brake engaged position at all times,
a conduit connecting said auxiliary cylinder with said master cylinder for applying fluid pressure to said auxiliary cylinder when the pressure is raised beyond a predetermined amount in said master cylinder,
normally closed valve means in said conduit for normally preventing reverse flow from said auxiliary cylinder to said master cylinder,
a second conduit connecting said auxiliary cylinder with the reservoir of said master cylinder, and
second valve means for opening and closing said second conduit and actuated by an ignition lock.

2. A system according to claim 1 wherein said second valve means is open when said ignition lock is locked and closed when said ignition lock is unlocked.

3. A system according to claim 2 wherein said lock is provided with an intermediate position between locked and unlocked positions with said valve being open when said lock is in said intermediate position.

* * * * *